US008084749B2

(12) United States Patent
Griep-Raming et al.

(10) Patent No.: US 8,084,749 B2
(45) Date of Patent: Dec. 27, 2011

(54) ELECTRODE FOR INFLUENCING ION MOTION IN MASS SPECTROMETERS

(75) Inventors: Jens Griep-Raming, Ganderkesee (DE); Wilko Balschun, Delmenhorst (DE); Alexander Makarov, Bremen (DE); Eduard V. Denisov, Bremen (DE); Joachim Müller, Ahrensfelde (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 270 days.

(21) Appl. No.: 12/429,460

(22) Filed: Apr. 24, 2009

(65) Prior Publication Data

US 2010/0224774 A1 Sep. 9, 2010

(30) Foreign Application Priority Data

Feb. 16, 2009 (DE) ..................... 20 2009 002 192 U

(51) Int. Cl.
*B01D 59/44* (2006.01)
*H01J 49/00* (2006.01)

(52) U.S. Cl. .................... 250/396 R; 250/282; 250/288; 250/397

(58) Field of Classification Search .................. 250/282, 250/288; 438/20, 53
See application file for complete search history.

(56) References Cited

U.S. PATENT DOCUMENTS 5,359,187 A * 10/1994 Weiss ...................... 250/214 VT
5,440,124 A * 8/1995 Kelly et al. ..................... 850/63
5,659,171 A * 8/1997 Young et al. .................. 250/289
5,864,137 A * 1/1999 Becker et al. ................. 250/287
6,051,832 A * 4/2000 Bradshaw ...................... 250/286
6,110,343 A * 8/2000 Ramsey et al. ............... 204/601
6,111,251 A * 8/2000 Hillenkamp .................. 250/288
6,245,227 B1 * 6/2001 Moon et al. ................ 210/198.2
6,284,115 B1 * 9/2001 Apffel ........................... 204/518
6,309,532 B1 * 10/2001 Tran et al. ..................... 205/687
6,316,768 B1 * 11/2001 Rockwood et al. ........... 250/287
6,394,942 B2 * 5/2002 Moon et al. ................... 438/712
6,924,158 B2 * 8/2005 Syms ............................. 438/20
6,987,263 B2 * 1/2006 Hobbs et al. .................. 250/288
7,154,088 B1 * 12/2006 Blain et al. .................... 250/292
7,157,176 B2 * 1/2007 Tanuma ........................ 429/483
7,274,015 B2 * 9/2007 Miller et al. .................. 250/288
7,279,681 B2 * 10/2007 Li et al. ......................... 250/292
(Continued)

FOREIGN PATENT DOCUMENTS

GB 2 389 704 A 12/2009

OTHER PUBLICATIONS

Dieter Gerlich, "Inhomogeneous FR Fields: A Versatile Tool for the Study of Processes with Slow Ions", Advances in Chemical Physics Series, vol LXXXII—1992.

*Primary Examiner* — David A Vanore
(74) *Attorney, Agent, or Firm* — Laurence P. Colton; Smith Risley Tempel Santos LLC

(57) ABSTRACT

An electrode for influencing ion motion in mass spectrometers, having a dielectric substrate and a conducting layer on portions of the substrate, wherein peripheral borders, edges or convex shapes of the conducting layer adjoin free regions of the substrate. According to the invention, a dielectric layer is provided on transitions from the conducting layer to the adjoining free regions of the substrate such that at least some of the peripheral borders, edges or convex shapes of the conducting layer are covered.

21 Claims, 4 Drawing Sheets

U.S. PATENT DOCUMENTS

| | | | | |
|---|---|---|---|---|
| 7,291,512 | B2 * | 11/2007 | Unger | 438/53 |
| 7,391,020 | B2 * | 6/2008 | Bousse et al. | 250/288 |
| 7,442,920 | B2 * | 10/2008 | Scheidemann et al. | 250/281 |
| 7,498,569 | B2 * | 3/2009 | Ding | 250/282 |
| 7,615,744 | B1 * | 11/2009 | Syms | 250/288 |
| 2009/0189064 | A1 * | 7/2009 | Miller et al. | 250/282 |
| 2010/0243883 | A1 * | 9/2010 | Vidal-De-Miguel | 250/282 |
| 2011/0002109 | A1 * | 1/2011 | Hauschild et al. | 361/809 |

* cited by examiner

ELECTRODE FOR INFLUENCING ION MOTION IN MASS SPECTROMETERS

STATEMENT OF RELATED APPLICATIONS

This patent application claims priority on and the benefit of German Application No. 20 2009 002 192.0 having a filing date of 16 Feb. 2009, which is incorporated herein in its entirety.

BACKGROUND OF THE INVENTION

1. Technical Field

The invention relates to an electrode for influencing ion motion in mass spectrometers, having a dielectric substrate and a conducting layer on portions of the substrate, wherein peripheral borders, edges or convex shapes of the conducting layer adjoin free regions of the substrate. "Free regions" are such regions which are not covered by the conducting layer. The layers are relatively thin, of the order of micrometers. Borders, edges or convex shapes are typically hardly visible or invisible elevations relative to the surface of the substrate.

The invention particularly relates to electrodes for ion-optical elements in mass spectrometers, preferably combined with a high DC voltage or a radiofrequency high voltage. A preferred application of the invention relates to electrodes with a metallic coating on an insulating substrate.

2. Related Art

Termination electrodes which are formed from a ceramic plate as a substrate in combination with a metallic coating may be provided in curved radiofrequency ion traps. The metallic coating is only applied to the substrate in regions, specifically in a region which is "visible" to the ions. Electrical discharges can be observed in the region of the peripheral edges of the electrically conducting, metallic coating. It is even possible for whiskers to be formed over time in the vicinity of the peripheral edges. This increases the risk of an electrical flashover or breakdown still further.

Electrical discharges can occur under all vacuum conditions, even in RF ion traps for ion storage or cooling. The distances of the voltage-carrying parts to each other are important for avoiding electrical charges. Although said distances can be altered, this is always associated with undesired changes in the electric field geometry.

U.S. Pat. No. 6,316,768 B1 describes the use of printed circuit boards (PCBs) in mass spectrometers. Here, the PCBs can also have electrodes suitable for ion transport.

BRIEF SUMMARY OF THE INVENTION

It is an object of the present invention to avoid electrical flashovers between electrodes in a mass spectrometer. Further objects of the invention are the avoidance of whisker formation and leakage currents.

The electrode according to the invention is characterized by a dielectric layer on transitions from the conducting layer to the adjoining free regions of the substrate such that at least some of the peripheral borders, edges or convex shapes of the conducting layer are covered. Preferably, the adjoining free regions on the one hand and the adjoining regions of the conducting layer on the other hand are also covered by the dielectric layer. Electrical flashovers emanating from the edges or convex shapes are effectively prevented in otherwise unchanged operating conditions. It is possible to work with higher voltages, depending on the application and individual part in question in the mass spectrometer.

Advantageously, the dielectric substrate, which is typically a plate-shaped substrate, is composed of a ceramic or glass-ceramic material. The conducting layer on the substrate is in particular a metallic layer.

According to a further idea of the invention, it is possible for a plurality of conducting layers to be arranged on the substrate, in particular next to one another or with at least one conducting layer on both sides of the substrate. The conducting layers can also merge into one another or be connected to one another, for example in the region of outer edges or recesses in the substrate.

Advantageously, the dielectric layer is composed of glass or a glass-ceramic material. The use of epoxide or polycarbonate layers is also possible.

According to a further idea of the invention, it is possible for the substrate to have an opening, bore or recess, for example for ions to pass through in a lens arrangement. An ion beam is then preferably aligned perpendicularly to the plane of the substrate.

According to a further idea of the invention, it is possible for the dielectric layer to cover all free edges or convex shapes of the conducting layer and regions of the substrate adjacent thereto. Alternatively, the dielectric layer covers only part of the free edges or convex shapes of the conducting layer.

According to a further idea of the invention, a slit which extends through the substrate is provided in a portion of a transition from the conducting layer to the substrate—next to a border region of the conducting layer.

The invention also relates to a mass spectrometer with at least one electrode according to the invention. In particular, the mass spectrometer has a mass analyzer designed like an Orbitrap ion trap. In the Orbitrap, the trapped ions move in orbits about a central electrode due to electrostatic attraction and, in the process, oscillate along the axis of the central electrode. The frequency of the oscillation generates signals which are converted into mass/charge ratios by a Fourier transform. "Orbitrap" is a registered trademark of Thermo Fisher Scientific (Bremen) GmbH, Germany.

According to a further idea of the invention, the mass spectrometer can have an ion trap which is combined with a mass analyzer. Here, the mass analyzer itself can also be built in the design of an ion trap. It is a curved ion trap, in particular in the case of the ion trap arranged outside of the mass analyzer.

Advantageously, an API ion source is assigned to the mass spectrometer. API is an abbreviation for "atmospheric pressure ionization". However, it is also possible to use other ion sources.

According to a further idea of the invention, the mass spectrometer has a mass analyzer designed like a TOF analyzer. TOF is an abbreviation for "time of flight". However, it is also possible to use other mass analyzers.

According to a further idea of the invention, the mass spectrometer can have a collision cell or a reaction cell. Said cell is preferably coupled to an ion trap.

The invention also relates to a method for determining the mass of ions which has the following features:

- the ions are generated in an ion source, led through an electric field and analyzed thereafter to determine their weight,
- the electric field is generated by electrodes,
- at least one of the electrodes has an electrically conducting layer on a dielectric substrate,
- free regions of the substrate, to be precise regions without an electrically conducting layer, are provided, a dielectric layer is provided at least in part on transitions from the conducting layer to the adjoining free regions of the substrate.

In the method, an API ion source can be provided as an ion source.

According to a further idea of the invention, the dielectric substrate is composed of at least one of the following materials: glass, ceramics, glass ceramics, silica glass, silicate glass, organic glass and polycarbonate. One or more of these materials can also be provided as material for the dielectric layer.

Advantageously, the electrically conducting layer on the substrate is a metallic layer.

Peripheral borders, edges or convex shapes of the conducting layer can adjoin the free regions of the substrate. Here, the borders, edges or convex shapes can at least in part be covered by the dielectric layer. In the process, the free regions of the substrate can at least in part also be covered by the dielectric layer.

Incidentally, further features of the invention are disclosed in the description and the claims.

BRIEF DESCRIPTION OF THE DRAWING FIGURES

Advantageous embodiments of the invention will be explained in more detail below on the basis of the drawings, in which.

DETAILED DESCRIPTION OF PREFERRED EMBODIMENTS

Figure 1:
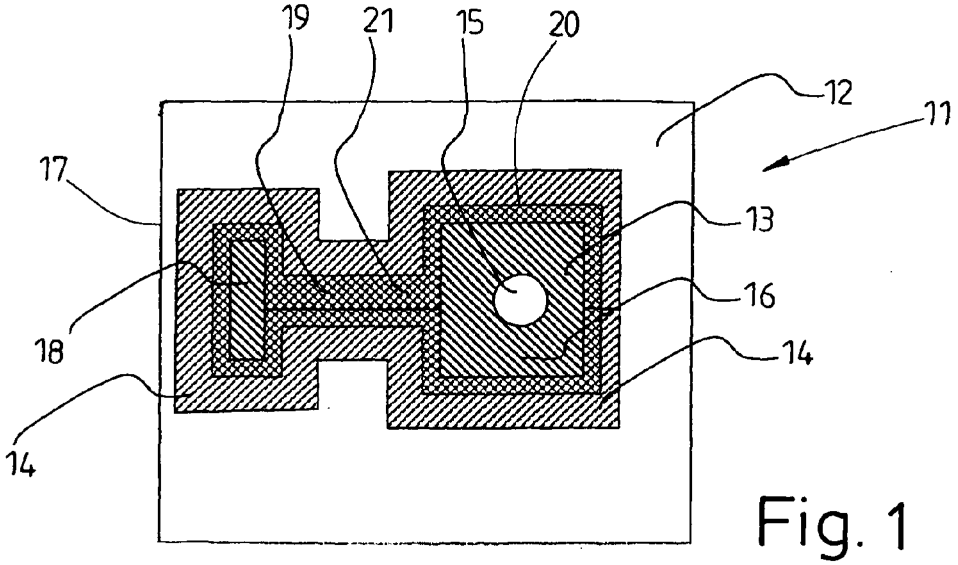
FIG. 1 shows a schematic illustration of the invention in a plan view.

According to FIG. 1, an electrode 11 to be installed in a mass spectrometer consists of at least one electrically insulating substrate 12, a conducting layer 13 applied at least in part thereon and a dielectric layer 14. The substrate 12 is preferably designed like a plate, rectangular in this case, and is in particular composed of a ceramic, chemically inactive material.

The substrate 12 has, slightly eccentrically, an in this case circular opening 15 for ion beams to pass through. The substrate 12 is covered by the conducting layer 13 around the opening 15 and in further regions of said substrate.

The conducting layer 13 is preferably metallic and comprises a number of functional regions: an electrode surface 16 extends around the opening 15. There is a contact surface 18 in the vicinity of an outer border 17 of the substrate 12, which contact surface 18 is connected to the electrode surface 16 via a conductor region 19.

The electrode surface 16 preferably extends rectangularly or even squarely around the opening 15. By contrast, the contact surface 18 is designed to be slightly smaller, but is preferably also rectangular. The conductor region 19 represents the shortest, in this case strip-like, connection between the electrode surface 16 and the contact surface 18.

Figure 2:
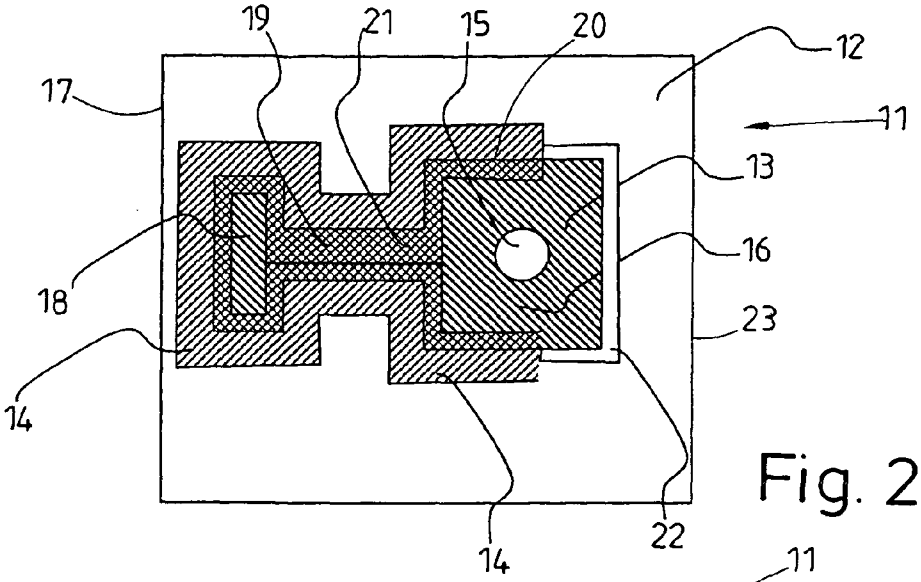
FIG. 2 shows a modification with respect to FIG. 1.
Figure 3:
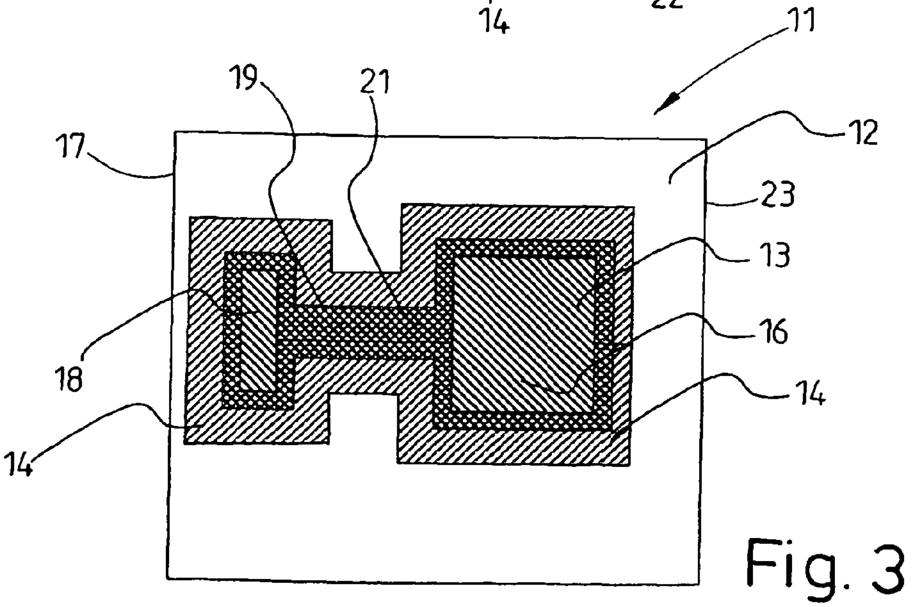
FIG. 3 shows a further modification with respect to FIG. 1.

The dielectric layer 14 covers the border regions of the conducting layer 13, in particular a peripheral edge 20. In FIGS. 1 to 3, the conducting layer 13 is shaded from top left to bottom right, and the dielectric layer 14 from bottom left to top right. There is a cross hatched region 21 wherever there is covering.

The dielectric layer 14 is preferably composed of glass, a glass-like or glass-ceramic material which advantageously is as chemically inactive as possible. The layer has a thickness of, for example, 50 μm, with an insulation of approximately 1.5 kV per 25 μm. Other layer thicknesses can be obtained by multiple applications. 7401 Glass Encapsulant by DuPont is a preferred material.

The conducting layer 13 is formed, for example, by a metallic layer with a thickness of 3 μm to 4 μm. The conductor region 19 of said conducting layer is completely covered by the dielectric layer 14, see the cross hatching in FIGS. 1 to 3.

The contact surface 18 is covered on the edge face by the dielectric layer 14 with a central region remaining uncovered for electrical connections (not shown). Analogously, this is true for the electrode surface 16. In this case too, a central region, not covered by the dielectric layer 14, is provided which has the opening 15 in the middle. Hence, the dielectric layer 14 extends over portions of the conducting layer 13 and free regions of the substrate 12. In this sense, free regions are those regions which are not covered by the conducting layer 13.

As a result of the dielectric layer 14, electrical flashovers and the formation of whiskers, particularly in the region of the peripheral edge 20, are avoided or higher voltages can be applied using the same geometrical conditions. This is of great importance, particularly in the context of applying the invention in a mass spectrometer and the vacuum conditions prevailing there.

In the embodiment in accordance with FIG. 2, a slit 22 extends around part of the electrode surface 16, preferably about approximately half the electrode surface 16 and adjacent to a border 23 of the substrate 12, the border 23 lying opposite the border 17.

Like the opening 15, the slit 22 also extends through the substrate 12, but, alternatively, it is also possible for said slit to be worked into the surface, in the manner corresponding to a groove. In FIG. 2, the dielectric layer 14 is only provided outside of the slit 22. In particular, the slit 22 prevents voltage drains or discharges along the surface of the substrate 12. Leakage paths are preferably approximately 4 mm or more. It is also possible for the leakage paths to be between 1 and 10 mm, depending on the application.

The width of the slit 22 is preferably approximately 0.3 mm or more. In particular, provision is made for the width of the slit to be between 0.5 mm to 1 mm.

Whereas an ion beam can pass through the electrodes illustrated in FIGS. 1 and 2, FIG. 3 illustrates an exemplary embodiment for a closed termination electrode which however can be designed precisely as illustrated in FIG. 1, with the exception of the lack of the opening 15.

Figure 4:
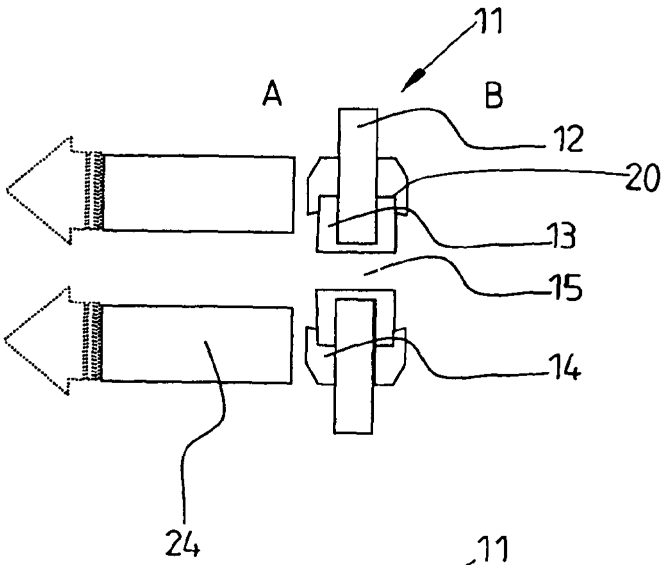
FIG. 4 shows a cross section of part of an ion trap.

FIG. 4 shows an application of the electrode 11 according to the invention, specifically the arrangement in an ion trap. It can be seen from the cross-sectional view that the substrate 12 is also coated with the conducting layer 13 in the region of the opening 15, so that the electrically conducting layer 13 on a side A of the electrode 11 is electrically conductively connected to the conducting layer on side B of the electrode 11.

In this case, the dielectric layer 14 is also provided on both sides A, B of the electrode 11. The peripheral edge 20 and adjoining regions of the substrate 12 on the one hand, and the conducting layer 13 on the other hand are in particular covered on both sides A, B. Rod-like radiofrequency electrodes 24 are arranged upstream (or downstream) of the electrode 11 in the direction of an ion trajectory.

Figure 5:
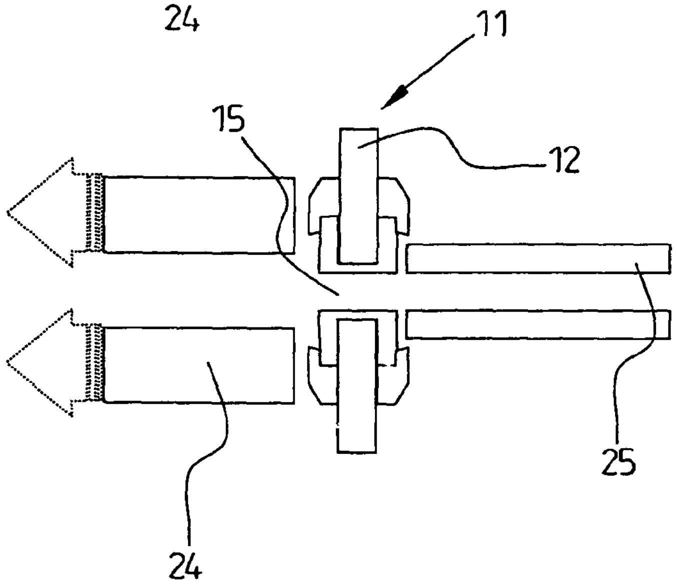
FIG. 5 shows a modification with respect to FIG. 4.
Figure 6:
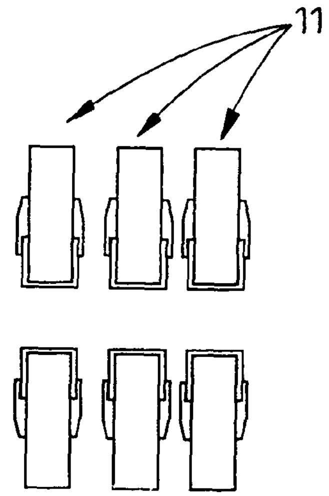
FIG. 6 shows a cross section of an arrangement of a number of electrodes, for example for a TOF mass spectrometer.

For reasons of improved clarity, no shadings are shown for the parts 12, 13, 14 illustrated in cross-section in FIGS. 4 to 6.

In order to complete the illustration in FIG. 4, FIG. 5 shows rod-like electrodes 24, 25 on both sides of the electrode 11. Said rod-like electrodes can also be designed and arranged like a multipole. As long as the electrode 11 in FIGS. 4 and 5 is provided as a termination electrode of an ion trap, the electrode can also be designed like the exemplary embodiment in accordance with FIG. 3, that is to say without an opening 15.

The electrodes 11 according to the invention can also be arranged one behind the other repeatedly, for example to form an ion lens or an acceleration or reflector element (see FIG. 6). In said case, three electrodes 11 are arranged one behind the other, for example for use in a TOF mass spectrometer. Similar arrangements can also be provided in so-called stacked plate ion guides and ion mobility spectrometers, see GB 2 389 704 A, for example in combination with a radiofrequency DC voltage. Stacked plate ion guides and other possible applications are also known from Gerlich, D., Ng, C. & Baer, M. (ed.), State-Selected and State-to-State Ion-Molecule Reaction Dynamics, Part 1: Experiment, Inhomogeneous RF fields: A Versatile Tool for the Study of Processes with Slow Ions, John Wiley and Sons, Inc., 1992, LXXXII, 1-176.

Figure 7:
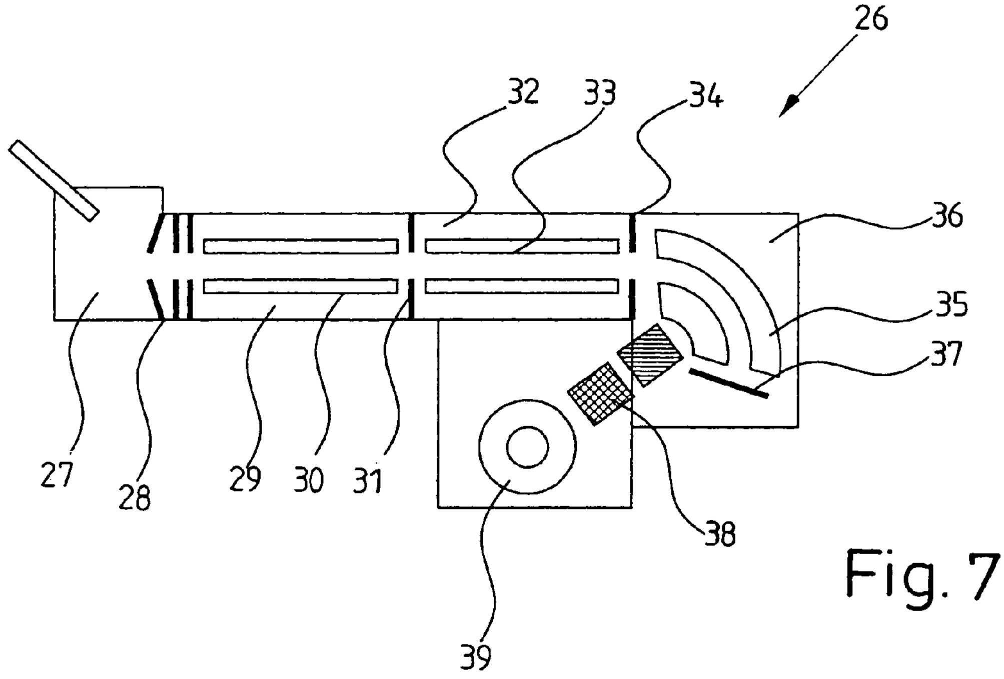
FIG. 7 shows a schematic design of a mass spectrometer with an Orbitrap analyzer.

A number of electrodes according to the invention are arranged in a mass spectrometer 26 in accordance with FIG. 7. Starting from an atmospheric pressure ion source (API ion source) 27, ions reach a vacuum chamber 29 with a multipole ion guide 30 through an ion interface 28 (comprising, for example, skimmers and ion lenses). This is adjoined by an ion lens 31 and a further vacuum chamber 32 with a further multipole ion guide 33 and a further ion lens 34.

A curved radiofrequency ion trap 35 in a vacuum chamber 36 is arranged downstream of the ion lens 34. The ion trap 35 terminates with a termination lens 37, analogously to FIG. 3.

The design of the electrodes according to the invention makes optimization of the ion guide, particularly in the region of the vacuum chambers 29, 32, 36, possible. Thus, the distances between the ion lenses and the multipole ion guides can be designed to be relatively small.

The curved ion trap 35 has ion optics 38 radially on the inside, by means of which ions can be transferred from the ion trap into a mass analyzer 39. In this case, the latter is designed like an Orbitrap analyzer. To this end, the ions are ejected from the ion trap 35 by high voltage pulses.

Figure 8:
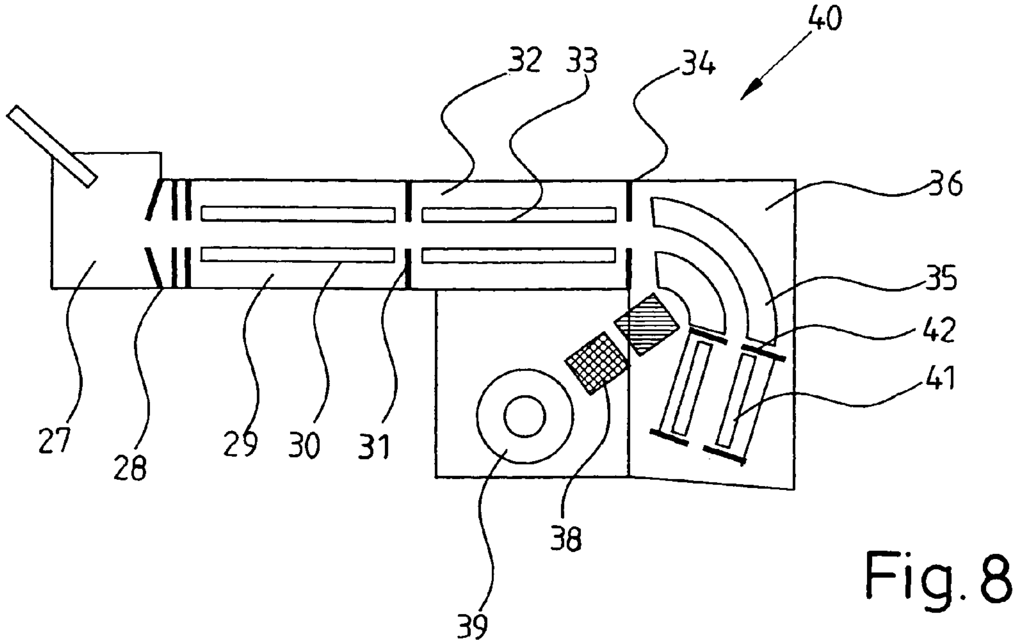
FIG. 8 shows a modification with respect to FIG. 7.

FIG. 8 shows a mass spectrometer 40, analogous to FIG. 7, but additionally with a collision cell 41 arranged behind the ion trap 35. Accordingly, an ion-permeable lens 42 is provided instead of the termination lens 37. By way of example, ions can be fragmented or ions can react with other ions or molecules in the collision cell 41, and subsequently be returned to the ion trap for storage and/or cooling. From there, the ions are ejected in the direction of the mass analyzer 39.

Figure 9:
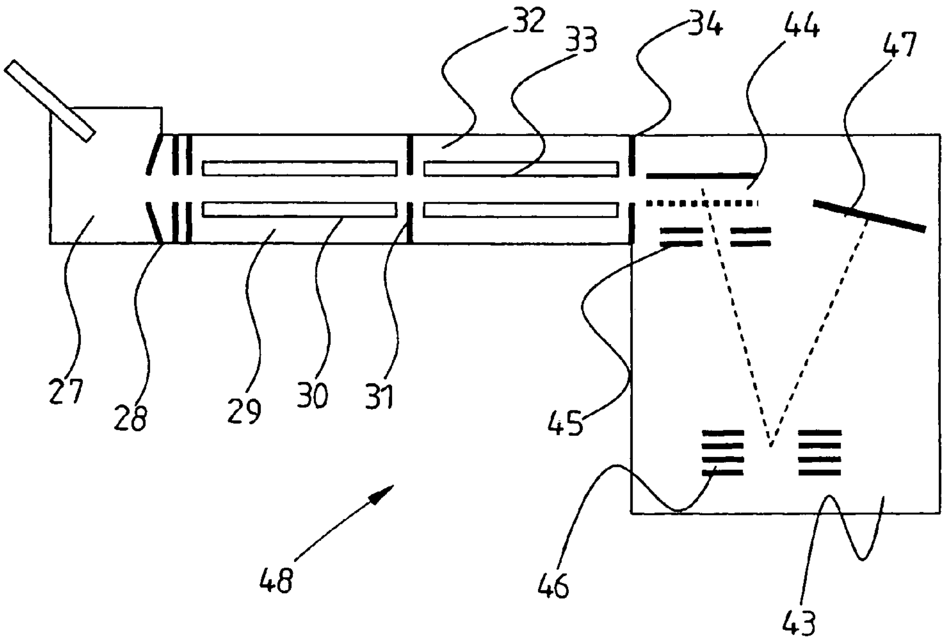
FIG. 9 shows a schematic illustration of a TOF mass spectrometer.

In the exemplary embodiment of FIG. 9, a TOF mass analyzer is provided arranged behind the ion lens 34 instead of the ion trap 35. Said TOF mass analyzer 43 has on its input side an orthogonal accelerator 44 by means of which the ions reach a receiver element 47 through an acceleration lens 45 and via a reflector-lens arrangement 46. The mass spectrometer designed in this fashion is labeled with the number 48 in FIG. 9.

Electrodes according to the invention can in particular be provided in the region of parts 28, 31, 34, 37, 42, 44, 45, 46 and 47. Naturally, other types of ion sources can also be used instead of API ion sources. The invention is preferably used in conjunction with any type of electrode for influencing ion motion in mass spectrometers. Accordingly, it is also possible to use different mass analyzers than the ones presented here.

Typically, there is a pressure of $5\times10^{-5}$ to $2\times10^{-4}$ mbar in the collision cell 41. Typically, the pressure in the ion trap 35 is similar. However, it is also possible for the collision cell 41 to have a significantly higher pressure of up to $10^{-2}$ mbar.

The distances between the electrodes according to the invention and other ion-optical elements are typically 1 mm to 1.2 mm, preferably 0.2 mm to 5 mm. A voltage of up to 2500 V at approximately 3.1 MHz is typically applied in the ion trap 35. Frequencies between 200 kHz and 10 MHz, in particular 1 to 5 MHz, are preferred. The ion lenses or electrodes have a voltage of typically up to 250 V. The ejection voltage is typically 3500 V, but can also be up to 5000 V.

LIST OF REFERENCE SYMBOLS

11 Electrode
12 Substrate
13 Conducting layer
14 Dielectric layer
15 Opening
16 Electrode surface
17 Border
18 Contact surface
19 Conductor region
20 Peripheral edge
21 Cover (cross-hatched)
22 Slit
23 Border
24 Radiofrequency electrodes
25 Radiofrequency electrodes
26 Mass spectrometer
27 API ion source
28 Ion interface
29 Vacuum chamber
30 Multipole ion guide
31 Ion lens
32 Vacuum chamber
33 Multipole ion guide
34 Ion lens
35 Radiofrequency ion trap
36 Vacuum chamber
37 Termination lens
38 Ion optics
39 Mass analyzer
40 Mass spectrometer
41 Collision cell
42 Lens
43 TOF Mass analyzer
44 Orthogonal accelerator
45 Acceleration lens
46 Reflector-lens arrangement
47 Receiver element
48 Mass spectrometer

What is claimed is:

1. An electrode (11) for influencing ion motion in mass spectrometers (26, 40, 48), the electrode having a dielectric substrate (12) and a conducting layer (13) on portions of the substrate (12), wherein peripheral borders, edges (20) or convex shapes of the conducting layer (13) adjoin free regions of the substrate (12), the electrode comprising a dielectric layer (14) on transitions from the conducting layer (13) to the adjoining free regions of the substrate (12) wherein at least one of the peripheral borders, edges (20) or convex shapes of the conducting layer (13) are covered by the dielectric layer (14).

2. The electrode according to claim 1, wherein the dielectric substrate (12) is composed of a ceramic material.

3. The electrode according to claim 1, wherein the conducting layer (13) on the substrate (12) is a metallic layer.

4. The electrode according to claim 1, wherein a plurality of conducting layers (13) are arranged on the substrate (12) next to one another or with at least one conducting layer (13) on both sides (A, B) of the substrate (12).

5. The electrode according to claim 1, wherein the dielectric layer (14) is composed of glass or of ceramic material.

6. The electrode according to claim 1, wherein the substrate (12) has an opening (15), bore or recess.

7. The electrode according to claim 1, wherein the dielectric layer (14) covers all free borders, edges or convex shapes of the conducting layer (13) and regions of the substrate (12) adjacent thereto.

8. The electrode according to claim 1, wherein the dielectric layer (14) covers only part of the free borders, edges (20) or convex shapes of the conducting layer (13).

9. The electrode according to claim 1, wherein a slit (22) is provided in the substrate in a portion of a transition from the conducting layer (13) to the substrate (12) next to a border region of the conducting layer.

10. A mass spectrometer with at least one electrode (11) for influencing ion motion in the mass spectrometer, the electrode having a dielectric substrate (12) and a conducting layer (13) on portions of the substrate (12), wherein peripheral borders, edges (20) or convex shapes of the conducting layer (13) adjoin free regions of the substrate (12), the electrode comprising a dielectric layer (14) on transitions from the conducting layer (13) to the adjoining free regions of the substrate (12) wherein at least one of the peripheral borders, edges (20) or convex shapes of the conducting layer (13) are covered by the dielectric layer (14).

11. The mass spectrometer according to claim 10, further comprising a mass analyzer (39) comprising an electrostatic ion trap in which trapped ions move in orbits about a central electrode due to electrostatic attraction and the trapped ions oscillate along an axis of the central electrode, wherein the frequency of oscillation generates signals that are converted into mass/charge ratios by a Fourier transform.

12. The mass spectrometer according to claim 10, further comprising an ion trap (35) combined with a mass analyzer (39).

13. The mass spectrometer according to claim 10, further comprising an API ion source.

14. The mass spectrometer according to claim 10 further comprising a time of flight mass analyzer comprising:

a receiver element (47);

an acceleration lens (45);

a reflector-lens arrangement (46); and on an input side, an orthogonal accelerator (44) by means of which the ions reach the receiver element (47) through the acceleration lens (45) and via the reflector-lens arrangement (46).

15. The mass spectrometer according to claim 10, further comprising a collision cell (41) or a reaction cell combined with an ion trap (35).

16. A method for determining the mass of ions, generating the ions in an ion source;

leading the ions through an electric field; and analyzing the ions thereafter to determine the weight of the ions, wherein the electric field is generated by electrodes, wherein at least one of the electrodes has an electrically conducting layer (13) on a dielectric substrate (12), wherein the substrate (12) comprises free regions without an electrically conducting layer that adjoin the conducting layer (13), and wherein a dielectric layer (14) is provided at least in part on transitions from the conducting layer (13) to the adjoining free regions of the substrate (12).

17. The method according to claim 16, further comprising an API ion source as the ion source.

18. The method according to claim 16, wherein the dielectric substrate (12) is composed of at least one selected from the group consisting of glass, ceramics and glass ceramics.

19. The method according to claim 18, wherein the dielectric substrate (12) is composed of at least one material selected from the group consisting of silica glass, silicate glass, organic glass and polycarbonate.

20. The method according to claim 16, wherein the electrically conducting layer (13) on the substrate (12) is a metallic layer.

21. The method according to claim 16, wherein peripheral borders, edges or convex shapes of the conducting layer (13) adjoin the free regions of the substrate (12) and in that the borders, edges or convex shapes are at least in part covered by the dielectric layer (13).

* * * * *